3,240,617
WATER-SOLUBLE FILMS OF ALKALI METAL
ETHYL CELLULOSE SULFATES
Martin E. Rowley, Rochester, N.Y., and Walter D. Slowig,
Fort Dix, N.J., assignors to Eastman Kodak Company,
Rochester, N.Y., a corporation of New Jersey
No Drawing. Filed Apr. 2, 1962, Ser. No. 184,529
9 Claims. (Cl. 106—181)

This invention relates to water-soluble films and more particularly to water-soluble films which are flexible over a wide temperature range.

Water-soluble films prepared from alkali metal salts of ethylcellulose sulfates are useful in a variety of applications, such as wrappings for commodities (e.g., detergents) which are to be employed in aqueous systems. These films are highly satisfactory with regard to clarity, solubility and flexibility under normal conditions of temperature and humidity. However, at low temperatures and low humidity, the films tend to become brittle. This may be a disadvantage, for example, in shipping packages wrapped with these films during cold weather or when the packages are subjected to cold storage or as freezer wrap. It therefore appeared desirable to provide water-soluble films of ethylcellulose sulfate (alkali metal salt) which have good flexibility at low temperatures.

One object of our invention is to provide new water-solubility ethylcellulose sulfate compositions. Another object of our invention is to provide water-soluble ethylcellulose sulfate films which remain flexible at low temperatures. Other objects of our invention will appear herein.

These objects are accomplished by water-soluble films comprising ethylcellulose sulfate (alkali metal salt) and a plasticizer selected from the group consisting of methyl ricinoleate, ethyl ricinoleate, and those compounds having the formula:

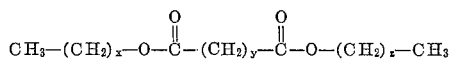

wherein $x$ and $z$ are 0–5, $y$ is 2–12 and $x+y+z$ is 8–12.

Our invention will be further illustrated by the following examples.

*Example 1*

A solution was prepared containing 46 parts of sodium ethylcellulose sulfate (41% ethoxyl and 5.5% sulfur, by weight), 125 parts each of methylene chloride and methanol, and 4 parts of diethyl sebacate. The resulting solutions were very viscous and were readily converted to clear films of 2 mils thickness by casting on glass plates. The films were dried by blowing heated air (52° C.) thereover. The resulting film was cut to appropriate size and converted into a small bag by heat sealing the edges. A cupful of granular detergent was placed in each bag and sealed. The bag with its contents was then placed in a desiccator of 20% humidity and stored 4 days. Upon removal, the bag was immediately sealed in a polyethylene bag and placed in a freezer at about −15° C. After 6 to 8 hours, the bag was removed and dropped to the floor from a height of about 5 feet. The bag was not shattered by the impact, because the film had satisfactory flexibility at low temperature and low humidity.

*Example 2*

This example was carried out in exactly the same manner as Example 1 except that 7 parts of diethyl sebacate was employed. Substantially the same results were obtained as in Example 1.

*Example 3*

The example was carried out in exactly the same manner as Example 1 except that 10 parts of diethyl sebacate was employed. Substantially the same results were obtained as in Example 1.

*Example 4*

A solution consisting of 200 parts of methanol, 100 parts of sodium ethylcellulose sulfate (41% ethoxyl and 5.5% sulfur, by weight) and 15 parts ethyl ricinoleate was cast on a glass plate and the solvent was removed therefrom bypassing warm air (65° C.) over the surface of the film. The film, 2 mils in thickness, was processed and tested in the same manner described in Example 1; the results of the test indicated that the film possessed excellent flexibility at low temperature and low humidity.

*Example 5*

A solution of 150 parts methanol, 60 parts of sodium ethylcellulose sulfate (41% ethoxyl and 5.5% sulfur, by weight) and 12 parts of n-butyl adipate was cast on a smooth film-forming surface and processed and tested as described in Example 1. The film possessed excellent flexibility at low temperature and humidity.

*Example 6*

A solution of 150 parts methanol, 60 parts of sodium ethylcellulose sulfate (41% ethoxyl and 5.5% sulfur, by weight) and 12 parts of di-n-amyl succinate was cast on a glass plate and solvent removed as described in Example 4. The film was tested as described in Example 1; the results showed the film to be well plasticized in the low temperature-low relative humidity test.

The water-soluble films which we have found to be useful in our invention comprise those prepared from an alkali metal salt of ethylcellulose sulfate containing, by weight, 38% to 45% ethoxyl and 4% to 7% sulfur. Preferably, we employ sodium ethyl-cellulose sulfate having 5% to 6% sulfur and 40% to 43% ethoxyl content by weight.

Plasticizer may range from about 5% to 50% based on the weight of the ethylcellulose sulfate. We have found that especially satisfactory results are obtained by employing 10% to 20% plasticizer.

The invention has been described in detail with particular reference to preferred embodiments thereof but it will be understood that variations and modifications can be effected within the spirit and scope of the invention as described hereinabove and as defined in the appended claims.

We claim:

1. A water-soluble film consisting essentially of an alkali metal salt of ethylcellulose sulfate having, by weight, an ethoxy content of 38% to 45% and a sulfur content of 4% to 7% and 5% to 50%, based on the weight of the ethylcellulose sulfate salt, of a plasticizer selected from the group consisting of methyl ricinoleate, ethyl ricinoleate and compounds having the formula:

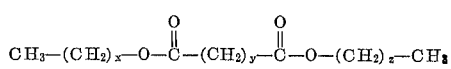

wherein $x$ and $z$ are 0–5, $y$ is 2–12 and $x+y+z$ is 8–12.

2. Claim 1 wherein the plasticizer is methyl ricinoleate.
3. Claim 1 wherein the plasticizer is ethyl ricinoleate.
4. Claim 1 wherein the plasticizer is diethyl sebacate.
5. Claim 1 wherein the plasticizer is di-n-amyl succinate.
6. A water-soluble film consisting essentially of sodium ethylcellulose sulfate containing by weight 40% to 43% ethoxyl and 5% to 6% sulfur and 10% to 20%, based on the weight of the ethylcellulose sulfate salt, of methyl ricinoleate.

7. A water-soluble film consisting essentially of sodium ethylcellulose sulfate containing by weight 40% to 43% ethoxyl and 5% to 6% sulfur and 10% to 20%, based on the weight of the ethylcellulose sulfate salt, of ethyl ricinoleate.

8. A water-soluble film consisting essentially of sodium ethylcellulose sulfate containing by weight 40% to 43% ethoxyl and 5% to 6% sulfur and 10% to 20%, based on the weight of the ethylcellulose sulfate salt, of diethyl sebacate.

9. A water-soluble film consisting essentially of sodium ethylcellulose sulfate containing by weight 40% to 43% ethoxyl and 5% to 6% sulfur and 10% to 20%, based on the weight of the ethylcellulose sulfate salt, of di-n-amyl succinate.

References Cited by the Examiner

UNITED STATES PATENTS 3,075,962   1/1963   Hiatt et al. _____ 260—231

OTHER REFERENCES

Buttrey: "Plasticizers," Second Edition, 1957, pages 71–79, and 100.

ROBERT F. WHITE, *Primary Examiner.*

MORRIS LIEBMAN, ALEXANDER BRODMERKEL,
*Examiners.*